(12) United States Patent
Corcoran

(10) Patent No.: US 9,769,249 B2
(45) Date of Patent: Sep. 19, 2017

(54) IMPACT ANALYSIS OF SERVICE MODIFICATIONS IN A SERVICE ORIENTED ARCHITECTURE

(71) Applicant: FMR LLC, Boston, MA (US)

(72) Inventor: Ian Corcoran, Roanoke, TX (US)

(73) Assignee: FMR LLC, Boston, MA (US)

( * ) Notice: Subject to any disclaimer, the term of this patent is extended or adjusted under 35 U.S.C. 154(b) by 180 days.

(21) Appl. No.: 14/608,535

(22) Filed: Jan. 29, 2015

(65) Prior Publication Data

US 2016/0226722 A1   Aug. 4, 2016

(51) Int. Cl.
G06F 15/16 (2006.01)
H04L 29/08 (2006.01)
H04L 12/24 (2006.01)

(52) U.S. Cl.
CPC ............ *H04L 67/10* (2013.01); *H04L 67/327* (2013.01); *H04L 41/50* (2013.01); *H04L 41/5025* (2013.01)

(58) Field of Classification Search
CPC ..... H04L 67/10; H04L 41/50; H04L 41/5025; G06F 11/34; G06F 17/30734
USPC .......................................................... 709/217
See application file for complete search history.

(56) References Cited

U.S. PATENT DOCUMENTS

| | | | | |
|---|---|---|---|---|
| 8,271,941 | B2 * | 9/2012 | Zhang | G06Q 10/00 717/107 |
| 8,447,829 | B1 * | 5/2013 | Geller | G06F 9/468 709/217 |
| 8,595,246 | B2 * | 11/2013 | Fay | G06F 17/30734 707/758 |
| 2006/0069717 | A1 * | 3/2006 | Mamou | G06F 17/30563 709/203 |
| 2008/0103786 | A1 * | 5/2008 | Zhang | G06Q 10/00 705/348 |
| 2009/0254411 | A1 * | 10/2009 | Bhattacharya | G06Q 10/0635 705/7.28 |
| 2010/0010968 | A1 * | 1/2010 | Redlich | G06F 17/30672 707/E17.014 |
| 2011/0173034 | A1 * | 7/2011 | Riepshoff | G06Q 10/00 705/7.11 |
| 2011/0225293 | A1 * | 9/2011 | Rathod | G06F 17/30867 709/224 |
| 2012/0069131 | A1 * | 3/2012 | Abelow | G06Q 10/067 348/14.01 |
| 2013/0013444 | A1 * | 1/2013 | Vandikas | G06Q 10/00 705/26.5 |
| 2015/0052229 | A1 * | 2/2015 | Gonzales | H04L 41/0806 709/221 |
| 2015/0379427 | A1 * | 12/2015 | Dirac | G06N 99/005 706/12 |

(Continued)

*Primary Examiner* — Krista Zele
*Assistant Examiner* — Michael A Chambers
(74) *Attorney, Agent, or Firm* — Proskauer Rose LLP

(57) ABSTRACT

A computer-implemented method includes accessing information indicative of a service on which to perform impact analysis; generating, by one or more processing devices, a service definition that is indicative of how an application locally utilizes the service; searching, by the one or more processing devices based on the service definition, a plurality of application code bases for one or more references to the service; identifying, based on searching, which applications utilize the service; and determining, by the one or more processing devices based on the identified application code basis, an impact of a modification to the service.

17 Claims, 13 Drawing Sheets

(56) References Cited

U.S. PATENT DOCUMENTS

2016/0078361 A1* 3/2016 Brueckner ........... G06N 99/005
  706/12

* cited by examiner

IMPACT ANALYSIS OF SERVICE MODIFICATIONS IN A SERVICE ORIENTED ARCHITECTURE

BACKGROUND

In a service oriented architecture (SOA), disparate applications use distributed services to retrieve/persist data in a standardized manner. These distributed services are independent from particular applications and are accessible by the applications requesting the service (e.g., via service requests). A service is a self-contained unit of functionality, such as retrieving an online bank statement. An application, or application program, is a software program that runs on a computer.

Services are combined by other software applications to provide the functionality of a large software application. SOA facilitates cooperation among computers connected over a network. A computer runs an arbitrary number of services, and each service is built in a way that ensures that the service can exchange information with others service in the network, without human interaction and without the need to make changes to the underlying program itself.

SUMMARY

In an embodiment of our techniques, a computer-implemented method includes accessing information indicative of a service on which to perform impact analysis; generating, by one or more processing devices, a service definition that is indicative of how an application locally utilizes the service; searching, by the one or more processing devices based on the service definition, a plurality of application code bases for one or more references to the service; identifying, based on searching, which applications utilize the service; and determining, by the one or more processing devices based on the identified application code basis, an impact of a modification to the service. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Generating the service definition comprises: accessing information indicative of service request and response elements for the service; searching source code files of the service for patterns matching the service request and response elements for the service; identifying, based on searching, one or more source code files with code matching the service request and response elements for the service; determining containing solutions for the identified one or more source code files; loading, by the one or more processing devices, the containing solutions into a parser; generating, based on application of the parser to the containing solutions, one or more syntax trees that specify which declaring classes are associated with the service request and response elements for the service; retrieving, from a data repository, information indicative of a symbol that is associated with the service request and response elements for the service and is used by the declaring classes to access the elements of the service; searching the declaring classes for one or more references to the symbol; and storing information indicative of which declaring classes reference which symbols.

The actions include determining one or more declaring assemblies that reference the declaring classes by searching a hierarchical structure of assemblies and classes; and updating the service definition to include the one or more declaring assemblies. Searching the plurality of application code bases for the one or more references to the service comprises: searching the plurality of application code bases for references to the one or more declaring assemblies. The actions include transmitting to a client device information indicative of one or more elements of the service; receiving, from the client device, information indicative of a selection of at least one of the one more elements; identifying a project that consumes the declaring assembly for the selected elements as specified by the service definition; grepping the source of that project to confirm a name of a symbol for the selected elements appears in the source; and executing the parser to identify valid symbol references in the consuming project to confirm the consumption. The service definition specifies how an application references the service, and wherein searching comprises: searching the plurality of application code bases for a reference to the service as specified by the service definition or for a reference to a file that calls the service as specified by the service definition. Determining the impact of the modification comprises: determining a cost of the modification by determining a number of applications that utilize the service and will be affected by the modification.

All or part of the foregoing may be implemented as a computer program product including instructions that are stored on one or more non-transitory machine-readable storage media and/or one or more machine-readable hardware storage devices that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DETAILED DESCRIPTION

A system consistent with this disclosure determines an impact of a service modification to consuming applications. To do so, the system identifies references to the service across multiple code bases of consuming applications. Generally, a code base is a set of solutions associated with an application. Generally, a solution is a set of source files and resources responsible for a particular area of functionality. Through the identification of references across multiple code bases for different applications, the system determines analytics data for the consuming applications (e.g., five subsystems of an application are dependent on a particular element of a service) and also determines budgeting data (e.g., the cost of a change to a particular element within a service or to a particular service).

Figure 1:
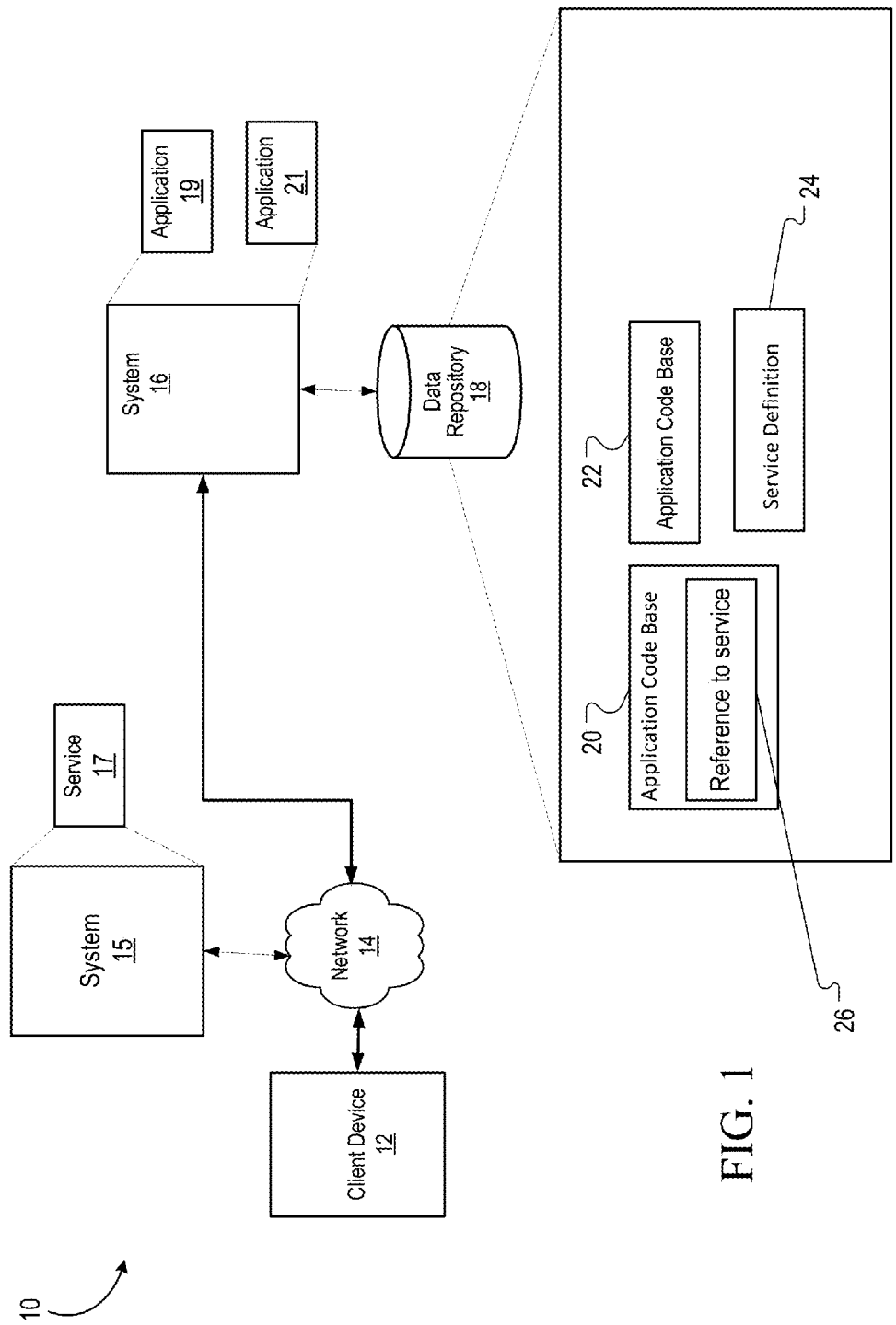
FIG. 1 is a diagram of a system for performing SOA impact analysis.

Referring to FIG. 1, networked system 10 performs SOA impact analysis, e.g., determining an impact of a modification to a service implemented in a SOA. Networked system 10 includes client device 12, network 14, systems 15, 16, and data repository 18. System 15 implements service 17, and system 16 implements applications 19, 21. A user (not shown) uses client device 12 to access an application. e.g., by viewing graphical user interfaces that display visual representations of portions of the application. Data repository 18 stores application code bases 20, 22 for applications 19, 21 respectively.

System 16 determines an impact (e.g., a cost) of a modification to service 17 (and/or to a particular element in the service) on consuming applications, e.g., applications utilizing service 17. Generally, a cost of a modification to a service is a number of applications that are utilizing the service. In addition to taking into account the number of applications that are utilizing the service, the cost of a service modification may also take into account the number of times each consuming application utilizes the service and how the consuming application utilizes the service. The manner in which a consuming application is utilizing the service affects the cost, because an application may consume a service in several different places. For example, a service which returns fund information may need to be called in order to display a customer's account profile, a product information page for that fund, or to display a trading screen where the user is trying to place a purchase into that fund. The code in the consuming application to call the service is often not centralized, i.e. there are several (in the above example, 3) places in the source code where service request/response elements are set and sent/received and interpreted. If a particular element in the service request/response is changed, and that element is utilized across multiple parts of the code base, the cost will go up in tandem with the number of element usages. The cost of a service modification is determined in accordance with equations 1 or 2, shown in the below Table 1.

TABLE 1

| | |
|---|---|
| Cost = # of applications utilizing the service | (Eq. 1) |
| Cost = Σ# of times consuming application utilizes the service, summed over all consuming applications | (Eq. 2) |

To determine the cost of a service modification (using one of the equations in the above Table 1), system 16 determines which of applications 19, 21 are utilizing the service and how applications 19, 21 are utilizing the service. A service is broken into various elements. Generally, a service element is a portion of a service for performing a particular functionality. A service modification includes a modification to one or more particular service elements. To determine the cost of a service modification, system 16 determines which applications are utilizing the particular service element and how those applications are using the particular service element.

To identify how applications are locally utilizing service 17, system 16 generates service definition 24. The service definition 24 includes information specifying how applications locally use a service, e.g., by including information specifying declaring assemblies and/or classes that are used by applications to access the service. The code base for service 17 differs from code bases 20, 22 for applications 19, 21, respectively. In order to access service 17, application code base 20 makes calls or references to the code base for service 17. Application code base 20 makes these references to the code base for service 17 through declaring classes and assemblies. Generally, a declaring assembly is an assembly that is declares various objects and classes. Generally, a declaring class is a class that declares various symbols for a service. Generally, a symbol is a particular object, field or function in a code base. At a service code level, the service code utilizes service elements to perform various functionality. At the declaring class level, those service elements are referenced via symbols. When an application utilizes a service, the applications reference the declaring assemblies for the service (or for particular elements in the service) and the symbols for particular service elements.

To determine how an application is using particular elements (or all elements) of a service, system 16 searches through the service code base to identify instances of those particular elements. System 16 utilizes a parser (e.g., the Roslyn C# parser) to translate the portions of the service code base referencing those particular elements to the declaring classes that reference those service elements. Generally, a parser is a utility (e.g., an application) capable of reading in a source file and translating it into a construct usable by a particular application, e.g., when an application has its own specific construct. That is, the parser identifies the declaring classes for particular service elements (or all service elements). System 16 searches (recursively) through the declaring classes to identify which classes reference symbols for elements of the service. Service definition 24 includes this list of the declaring classes and which declaring classes reference which symbols. System 16 identifies the relevant assemblies for the declaring classes by accessing from system 15 (or from data repository 18) a mapping of declaring assemblies to declaring classes. In another example, system 16 accesses (from system 15 or data repository 18) a hierarchical structure of assemblies and classes. System 16 searches through the structure to determine which assemblies include the relevant declaring classes.

Having identified the relevant declaring classes and built service definition 24, system 16 searches through the identified declaring classes for symbols that correspond to service elements of the service. System 16 presents to the user the identified symbols for the service. The user selects which symbols he/she is interested in. Using the selected symbols, system 16 searches across application code bases 20, 22 for references to service definition 24. There are various ways in which an application code base references a service definition, e.g., including a reference to the declaring assemblies that reference the selected symbols. Application code base 20 includes reference 26 to service definition 24. Based on reference 26, system 16 determines that the application implemented via application code base 20 utilizes service 17 and therefore is a consuming application of service 17.

Figure 2:
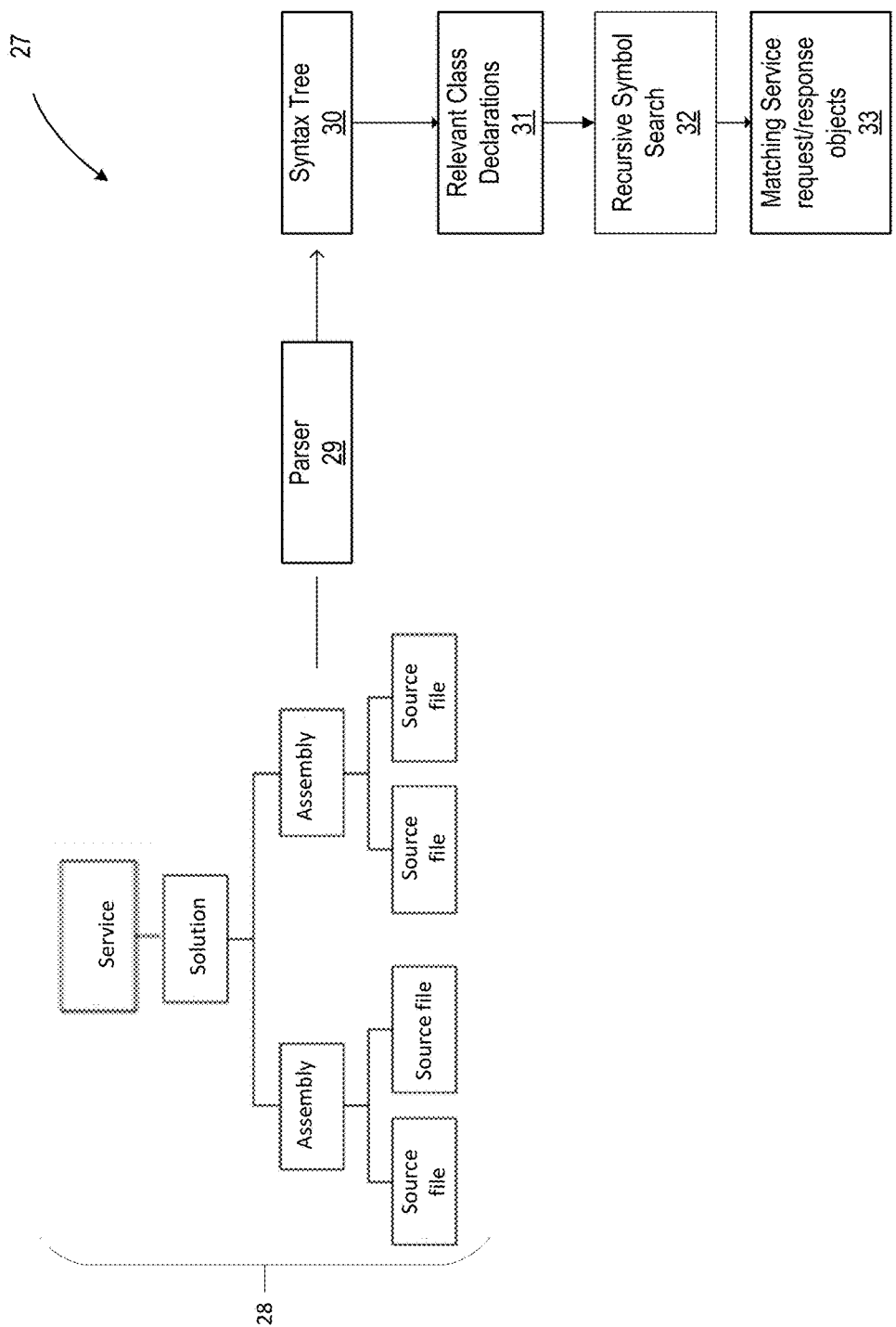
FIGS. 2-7 are flow diagrams of processes for performing SOA impact analysis.

Referring to FIG. 2, diagram 27 illustrates the components of generating a service definition. In operation, system 16 accesses service code base 28, e.g., from system 15. Service code base 28 is organized in a hierarchical structure, in which source files are grouped into assemblies, assemblies are grouped into solutions and the service itself comprises multiple solutions. System 16 searches service code base 28 for patterns matching service request/response elements of a particular service (e.g., a user selected service). Generally, a service request element is a call (or reference) to the service for data retrieval. Generally, a service response element is a data object for receiving data from the service that is responsive to the request. System 16 identifies the service request/response elements in various ways, e.g., a user inputting information identifying these elements into system 16, retrieval of the names of these elements from system 15 and so forth. Upon determining a match, system 16 identifies the containing assembly that includes the matching pattern. Using the identified assemblies, system 16 determines the containing solutions for those identified assemblies. System 16 loads the identified solutions into parser 29 to generate syntax tree 30.

Generally, a syntax tree is a tree representation of the abstract syntactic structure of source code written in a programming language. Each node of the tree denotes a construct occurring in the source code. These syntax trees provide a guide for how the applications are using the source files, solutions and projects for the service. The applications reference the source files via class declarations to classes that include the source files. Accordingly, the syntax trees include class declarations, e.g., declarations to classes that are being used by the applications.

Using syntax tree 30, system 16 identifies the relevant class declarations 31, e.g., the class declarations that are used by the service. System 16 recursively searches the class declarations 32 for the symbols that reference the service to build the service definition. Having identified which class declarations reference the symbols for the service, system 16 displays a listing of matching service request/response objects 33 for those symbols. A user may select which objects they are interested in determining an impact of a change to those objects.

Figure 3A:
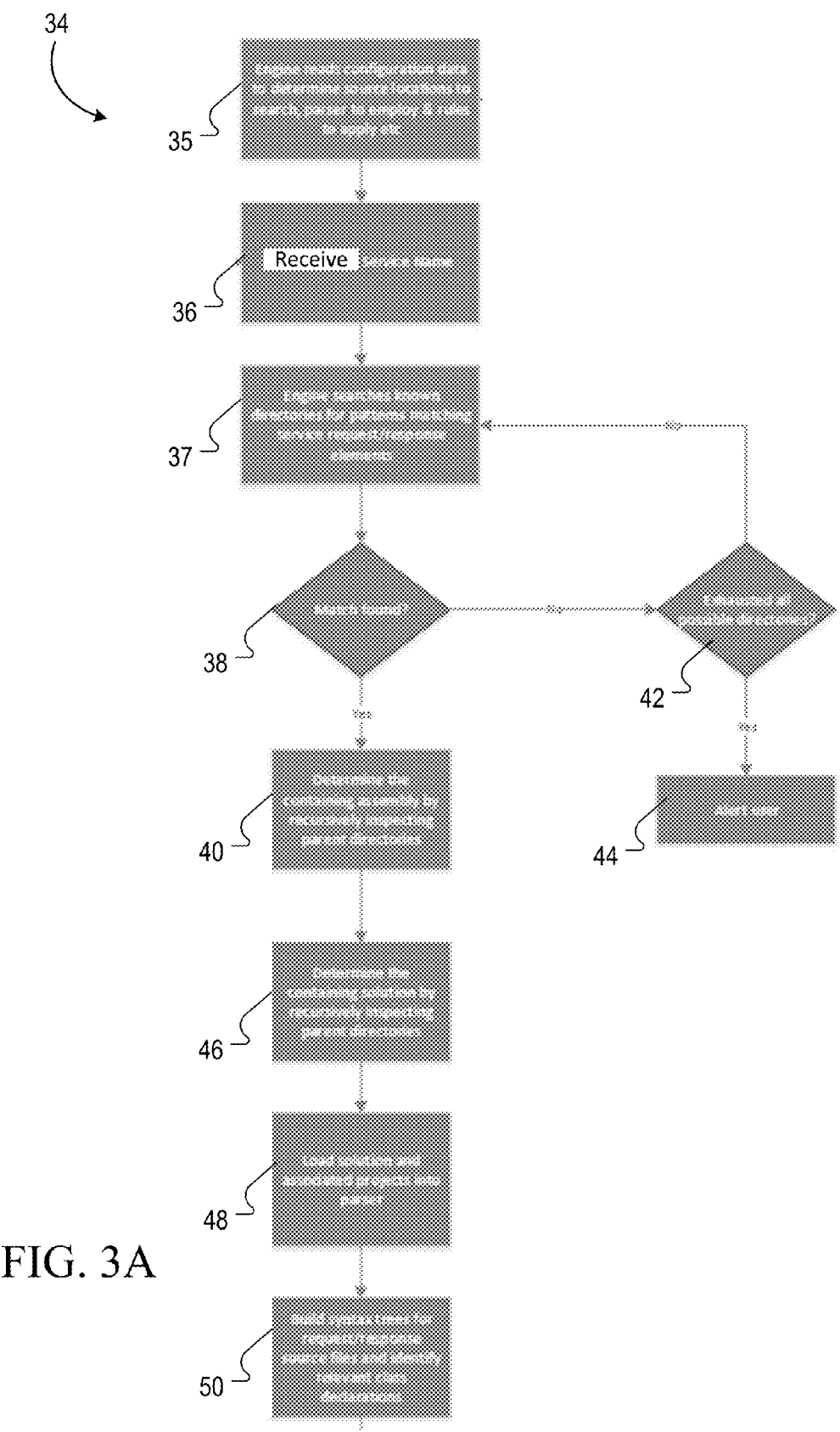

Referring to FIG. 3A, system 16 implements process 34 in generating a service definition. System 16 reads (35) configuration data for various code bases, e.g., code bases stored in a particular data repository. By reading the configuration data, system 16 identifies the hierarchical structure for the various codes bases and the location of directories. Configuration data includes data that specifies where to find an application's source code and the structure of that code base once it has been located. The application source code may be local or there may be connection details to a source control system. The configuration data specifies this information. For example, one particular subdirectory may include the application's representation of the service definition, so the system would look there to identify a symbol corresponding to a particular service element. Subdirectories may be configured to be ignored (e.g., a graphics folder which is known to contain application images and no source code). The configuration data specifies locations of the sources files for the various applications that are being utilized or accessed from system 16. System 16 also receives (36) information indicative of a user entered service name for a service that is utilized by consuming applications. In response, system 16 searches (37) the directories that are identified via the configuration data for files with patterns (of computer code) that match service request and/or response elements for the requested service. The directories are for the source files of the service itself. System 16 searches through the source files to identify lines of code that match the known service request and/or response elements for a particular service. There are various ways in which system 16 identifies service request and/or response elements, e.g., by a user inputting the service request and/or response elements or by system 16 looking-up the service request and/or response elements in a data file for a requested service.

System 16 determines portions of the service source files that reference the particular elements by determining (38) if a match is found between code in the source files and the service request and/or response elements. When no match is found, system 16 determines (42) if it has exhausted (by analyzing contents of) the possible directories in which source files (or other relevant data and resources) are located. If system 16 determines that it has exhausted all directories, system 16 alerts (44) a user that no match was found and that none of the system's applications utilize that particular service. If system 16 determines that it has not exhausted all directories, system 16 re-executes action 37 and continues searching directors for matching patterns.

When a match is found, system 16 determines (40) the containing assembly of the file that includes the matching pattern, by recursively inspecting parent directories. Generally, as assembly is a library of executable code. System 16 determines (46) the containing solution (for the containing assembly) by recursively inspecting parent directories. Generally, a solution is a set of source files and resources responsible for a particular area of functionality.

System 16 loads (48) the solutions and associated projects for the service itself into a parser. Generally, a solution is a set of projects associated with an application, and a project includes source files. A solution may also be referred to as an application code base or workspace.

Based on application of the parser to the source files of the service that include the matching patterns, system 16 builds (50) syntax trees for the source files that include the matching patterns (e.g., the source files that reference the service response/request elements). System 16 also identifies the relevant class declarations to the source files that include the matching patterns. The applications themselves call the class declarations, via a declaring assembly, to access to the service elements. The class declaration is in a source file that belongs to a particular project. For example, in the .NET world, "Solutions" include one or more "Projects" which include one or more source files. The projects get compiled into assemblies, any public classes defined in source files belonging to the assembly can now be referenced by any other project that has a reference to the assembly. A service element (response/request element) is reference by a symbol, e.g., in a class declaration.

Figure 3B:
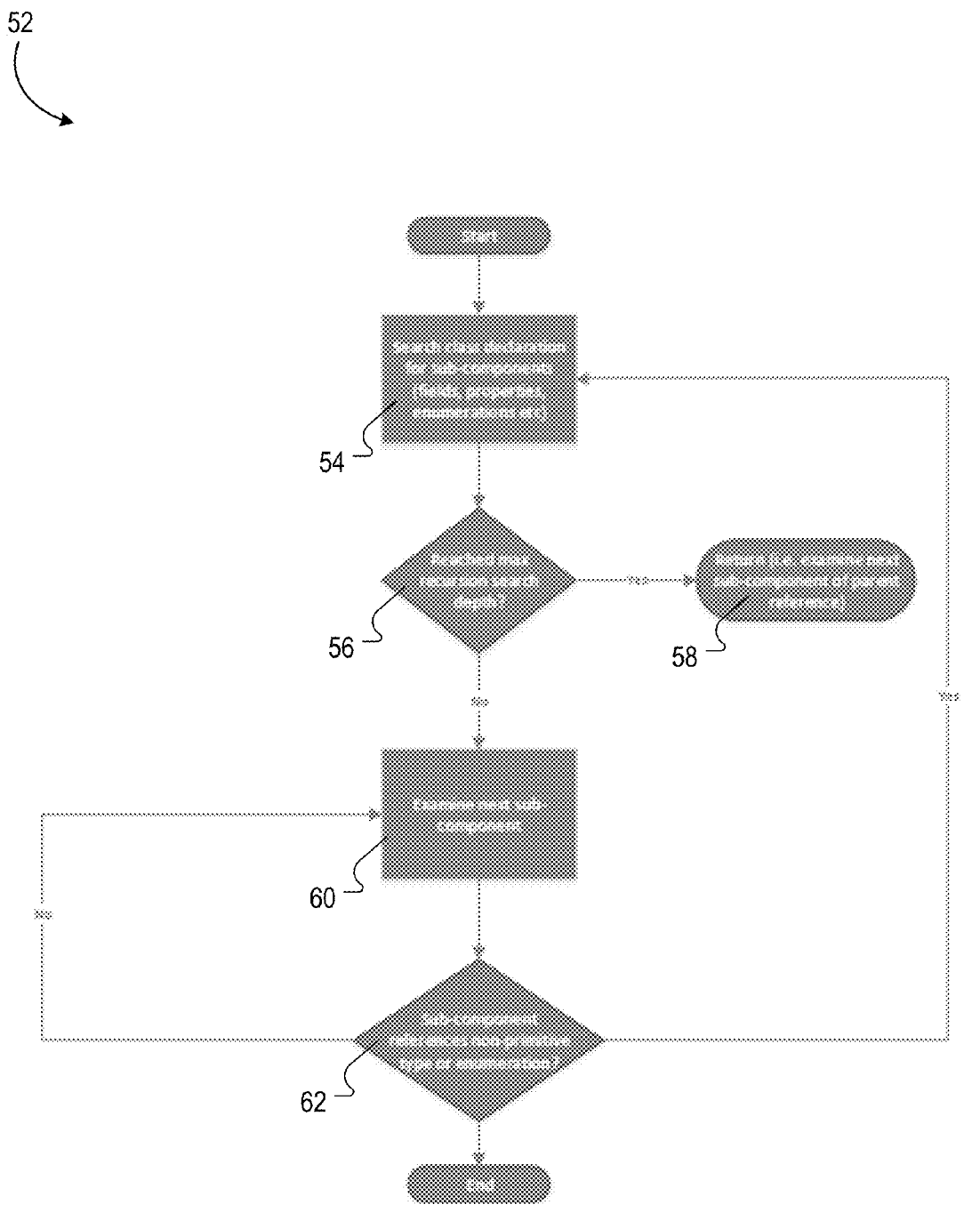

Referring to FIG. 3B, system 16 executes process 52 in recursively searching for symbols in the class declaration. By recursively searching for the symbols in the class declaration, system 16 identifies how many times and in what manner each class declaration uses a symbol and thereby utilizes a particular element of the service. System 16 searches (54) the class declarations for sub-components, e.g., fields, properties, enumerations, and so forth. System 16 determines (56) if it has reached a maximum recursion search depth for a particular class declaration. If the maximum recursion search depth is reached, system 16 returns (58) to examine the next sub-components of a parent reference (e.g., the same class declaration or another parent class declaration). If the maximum recursion search depth is not reached, system 16 examines (60) the next subcomponent and determines (62) whether that subcomponent references a non-primitive type or enumerator. When that subcomponent references a non-primitive type or enumerator, system 16 repeats action 54 and onward. When that subcomponent does not reference a non-primitive type or enumerator, system 16 repeats action 60 to examine the next-subcomponent. For each subcomponent that includes a non-primitive type or enumerator, system 16 determines if there is a match with the identified symbol for the particular service. System 16 continues with the recursive symbol search until the class declaration has been exhausted. At completion of process 52, system 16 generates a service definition of how applications are locally using the service. The service definition includes a list of which class declarations include symbols for the particular service and how and where those class declaration are referencing the symbols.

Figure 3C:
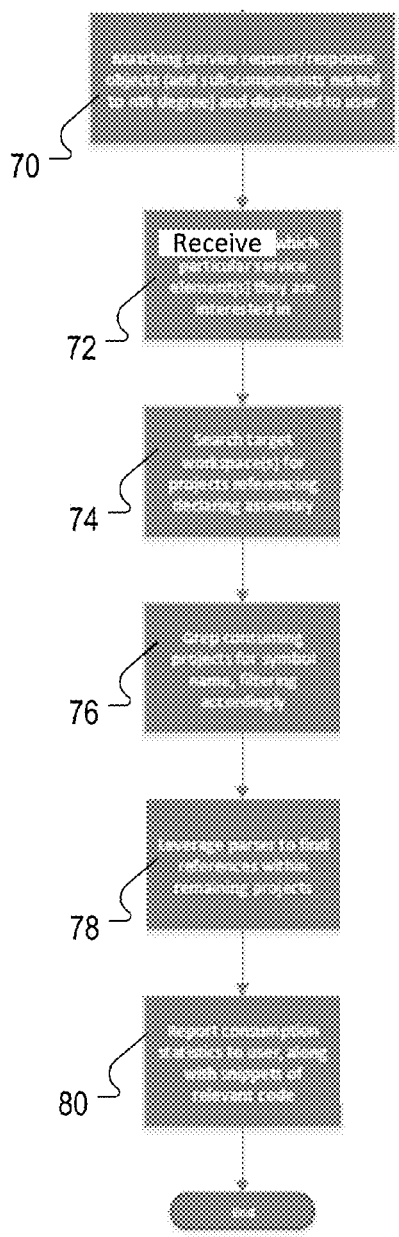

Referring to FIG. 3C, system 16 executes process 68 in determining which projects include the service definition, e.g., by including class declarations for the particular service. In operation, system 16 displays (70) matching service request/response objects, for a particular service. System 16 receives (72), from a client device of the user, which particular service elements the user is interested in. In response, system 16 searches (74) the workspaces for references to the declaring assembly. As previously described, system 16 generates the service definition that includes a list of which class declarations include symbols for the particular service. A class declaration is included in a declaring assembly—an assembly with a reference to the class declaration. By determining which applications reference the declaring assembly, system 16 determines which application use the class declarations for the service and thereby which applications utilize the service. Also, based on the service definition, system 16 looks-up how many times, where and how an element in a service is utilized for an application, because the service definition specifies how and where various elements are used in the service, e.g., based on the recursive search of the declaring classes. The results of this recursive search are included in the service definition.

The projects referencing the declaring assembly are consuming projects that utilize the service. System 16 uses the service definition to determine how the application is utilizing the service. System 16 greps (76) the consuming projects for the symbol. Prior to the grepping, the system has determined that (i) the application includes a project defining the service and (ii) which projects consume the assembly in which a particular symbol is defined. Prior the grepping, system has not determined if these projects consume the specific symbol yet. For example, if a "fund inquire" service is defined in an assembly "fund.dll", the system has identified by this point that a "product information" project references the fund.dll assembly. If the system is interested in a particular element (symbol) in the Fund Inquire service, e.g., the FundName symbol, the system greps the source files in the Product Information project to see if the word FundName appears. This avoids having to do computationally expensive reference searches if the element isn't used. Generally, to grep refers to a search of a file for a given pattern. By searching the consuming projects for the symbol of the requested service, system 16 determines how many projects are utilizing the service and how many times each project utilizes the service.

System 16 also leverages (78) the parser to find references within remaining projects. At this point, the system has identified a project which consumes the service definition assembly, grepped the source of that project to confirm the name of the symbol appears in the source. At this point, the system still has not determined if the symbol is consumed by that project (e.g., a symbol may have a common name shared across multiple services, e.g. SSN). So once the system has eliminated projects which consume the service definition assembly, but fail the grep test of having the symbol name in their source code, the system leverages the same parser it used to find the service definition in the first place, to find valid symbol references in the consuming project. As previously described, the parser specifies how an application (or project) locally utilizes a particular symbol. Accordingly, system 16 searches through the source code of the application to confirm that the symbol is being utilized in accordance with the parser. System 16 reports (80) consumption statistics, along with snippets of relevant code, e.g., such as code specifying how a project utilizes or references the service. The consumption statistics specify how many applications are using a service and how many times each application uses the service.

Figure 4:
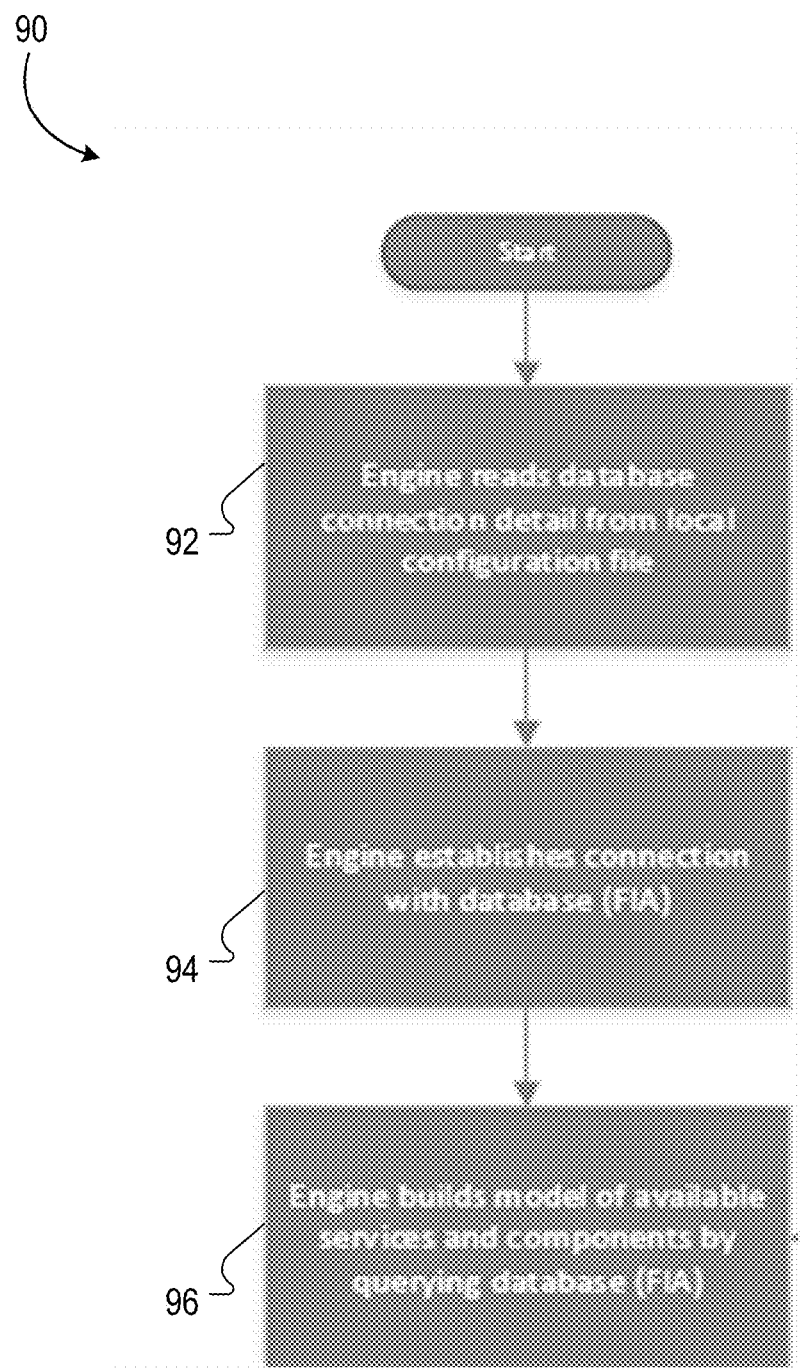

Referring to FIG. 4, system 16 executes process 90 in performing automated discovery of available services, e.g., by a particular system or systems, rather than having a user specify the name of a particular service. In operation, system 16 reads (92) database configuration details from a local configuration file (e.g., on system 16). System 16 establishes (94) a connection with the database, e.g., based on contents of the database connection file. System 16 builds (96) a model of available services and components by querying the database.

Figure 5:
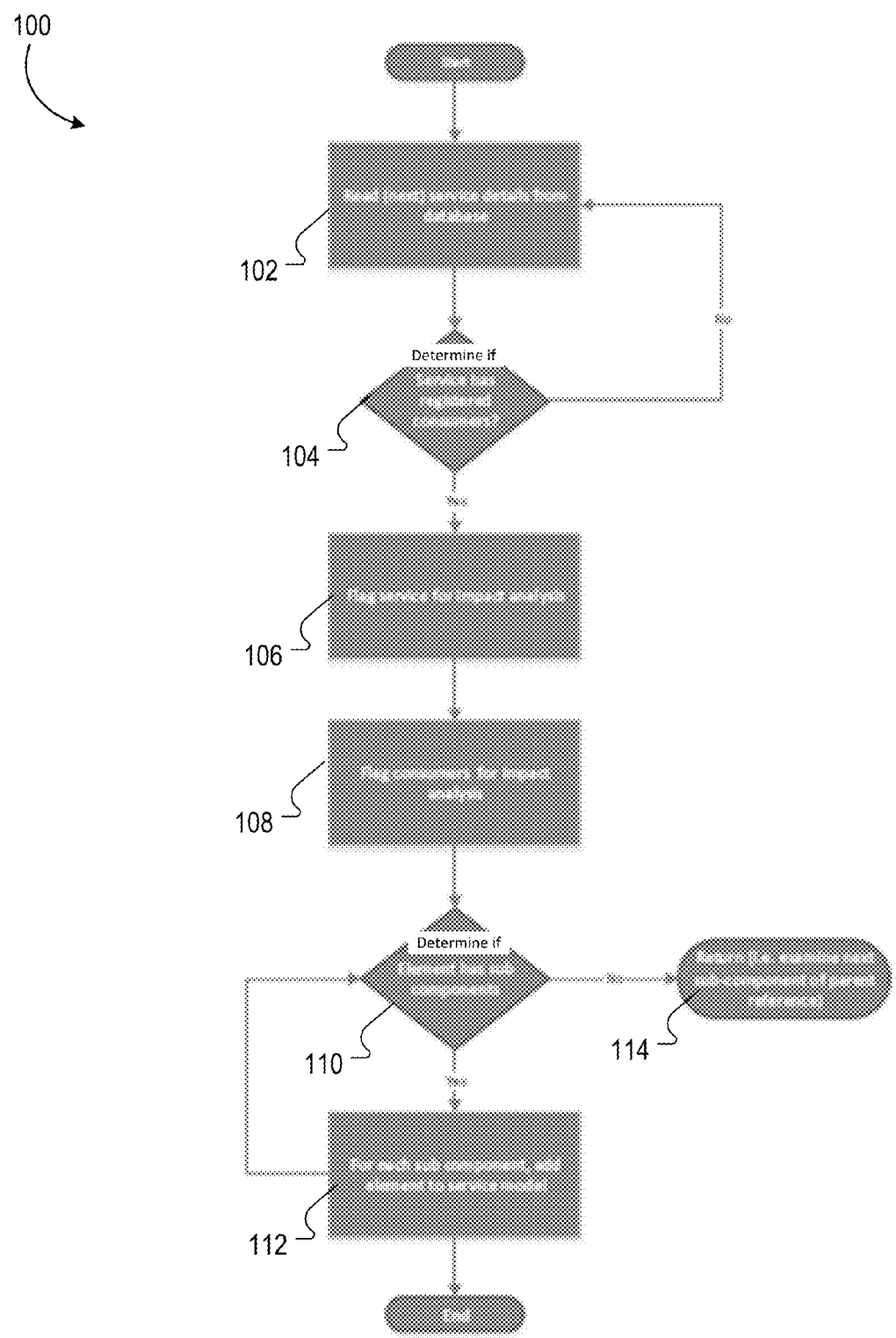

Referring to FIG. 5, system 16 executes process 100 in automatically identifying the elements of the various, available services. As previously described, system 16 uses these identified elements in determining which source files include patterns matching the identified elements and thereby reference the services themselves. In operation, system 16 reads (102) service details from the database. A service detail is information that specifies a service, e.g., a name of the service and other information. System 16 determines (104) whether the service has registered consumers, e.g., applications that are utilizing the service. When the service does not have registered consumers, system 16 returns to action 102 to read details for the next service. When the service does have registered consumers, system 16 flags (106) the service for impact analysis to determine an impact to consuming applications of changing the service. System 16 also flags (108) the consuming application for impact analysis, e.g., to determine how much a change to the service will impact the consuming application (e.g., based on how many times the consuming application references the service).

System 16 examines the elements of the service. System 16 determines (110) whether the elements have subcomponents. When system 16 determines that an element does not have subcomponents, system 16 examines (114) the next sub-components of the parent reference of the service or for another service. When system 16 determines that the element does not have subcomponents (and therefore represents the most granular form of element), system 16 adds (112) the element to the service model, i.e., information that specifies the elements of a particular service. Based on execution of process 100, system 16 generates a service model (e.g., a listing of the various elements in a service) for the available services. Generally, an element is a portion of a service definition that represents performance of an action, such as retrieving or requesting data.

Using the generated service models for the offered services, system 16 determines an impact of changing each of the services on each of the applications. For each consuming application flagged, system 16 reads configuration data (for those consuming applications) to determine source locations to search and parsers to apply. System 16 establishes a connection to a source control database (that stores service definition sources). For each service definition source, system 16 downloads the service definition source from the database. Using the downloaded service definition source, system 16 generates a service definition that specifies how an application locally uses the service, e.g., by implementing actions 37-50 (FIG. 3A) and actions 54-62 (FIG. 3B). For each application (e.g., each application consuming the service), system 16 downloads the application source files and performs actions 74-80 to determine which applications are utilizing the service.

Figure 6A:
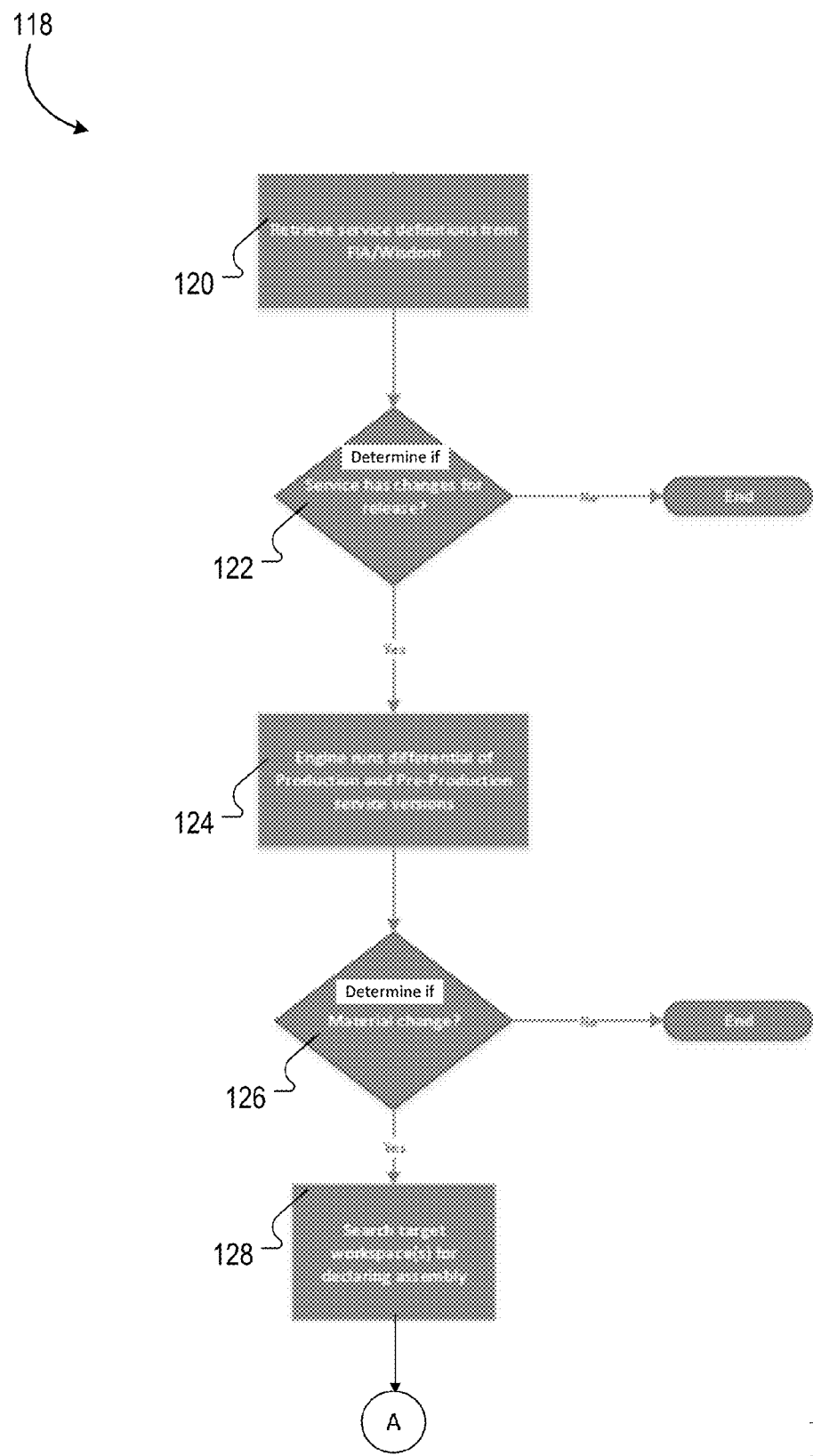

Referring to FIG. 6A, system 16 executes process 118 in determining whether to change a service. In operation, system 16 receives a move request to change, modify or move an aspect of a service. Generally, a move request is a mechanism to control which versions of which applications are allowed to be installed in which environment. For example, if system 16 determines a need to move a new version of an application into a particular environment, system 16 opens a move request which then needs to be approved before system 16 proceeds. There may be different levels of control for a move request, e.g., if system 16 wants to move a service update into a development environment, there would be few (if any approvals needed). If system 16 wants to move it into a formal SIT (systems integration testing) environment, the criteria for approval could be much stricter including both manual and automated rules, such as the one described below.

In response to the move request, system 16 determines whether a destination environment for the move request is a production environment or another predefined type of environment. If system 16 determines that the destination environment is not a production environment or another predefined type of environment, then system 16 rejects the move request. If system 16 determines that the destination environment is a production environment or another predefined type of environment, system 16 retrieves (120) a service definition from a data repository. System 16 determines (122) whether the service has changes for release. When the service does not have changes for release, process 118 terminates. When the service does have changes for release, system 16 runs (124) a differential program to determine a differential between the production and pre-production service version. The product service version is the version that is currently in production. The pre-production service version is the version with changes for release. The differential is indicative of the amount of variance or variation between the two versions. System 16 determines (126) whether the change is material, e.g., based on the differential. When the differential amount is above a threshold amount, system 16 determines that the change is material. When the differential amount is less than the threshold amount, system 16 determines that the change is immaterial. When system 16 determines that the change is immaterial, process 118 terminates.

When system 16 determines that the change is material, system 16 determines how many applications are utilizing the service and thus the impact of a change to the applications. To do so, system 16 searches (128) various workspaces for the declaring assembly (of the declaring classes for the service or for particular elements of the service).

Figure 6B:
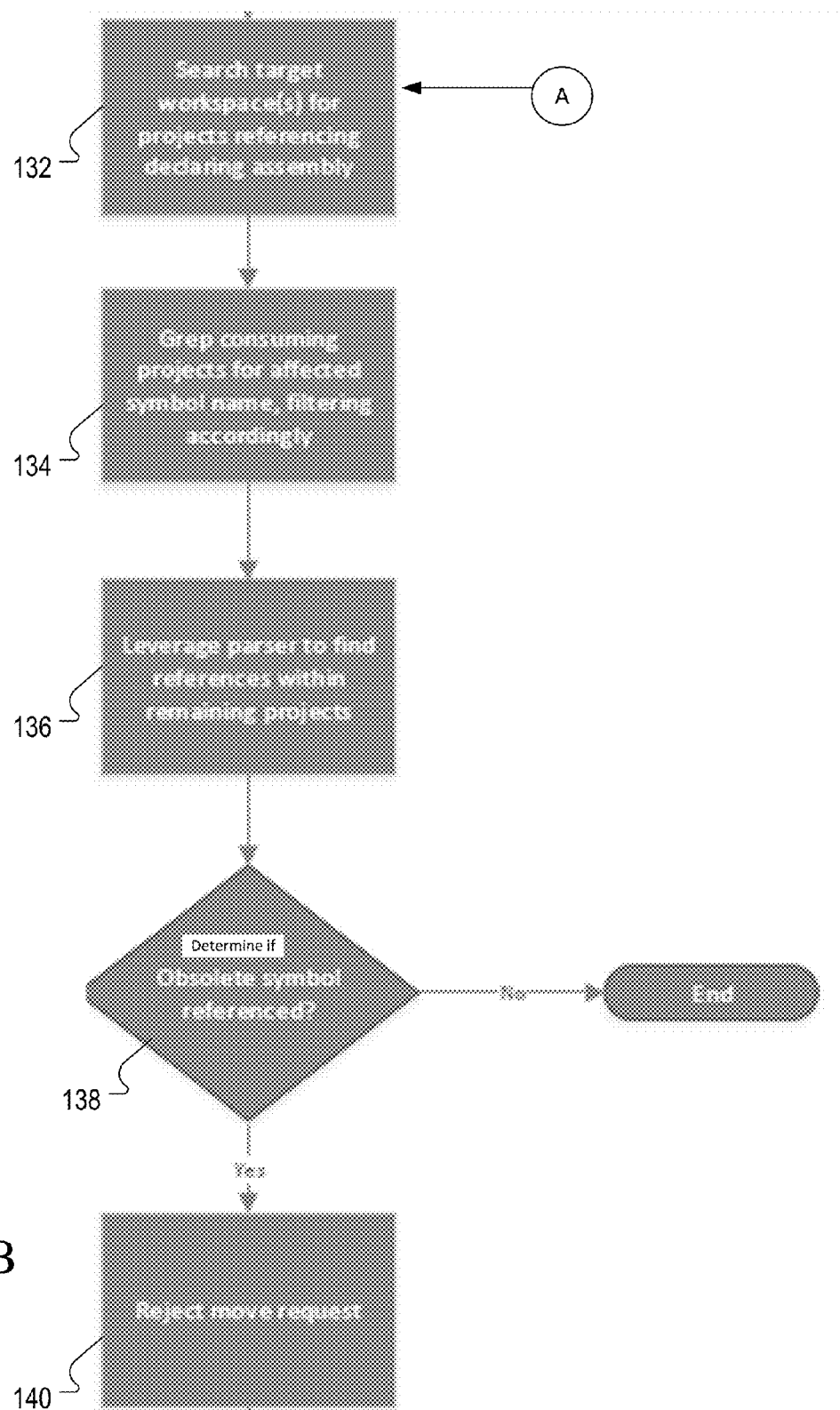

Referring to FIG. 6B, system 16 searches (132) target workspaces for projects referencing the declaring assembly, e.g., to determine which projects are relevant. System 16 greps (134) consuming projects for the affected symbol name (the symbol name that is affected by the change in versions). In determining whether a change is material, system 16 also determines which symbol is affected. For example, if a service element is deleted from once service version to the next, system 16 would look for applications still referencing a symbol corresponding to that service element. System 16 leverages (136) the parser to find references with the remaining projects, as previously described.

System 16 determines (138) whether the symbol referenced is obsolete. If an obsolete symbol is referenced, system 16 rejects (140) the move request to implement the change to the service. If the referenced symbol is not obsolete, system 16 terminates process 118 and allows the move request to proceed.

Figure 7:
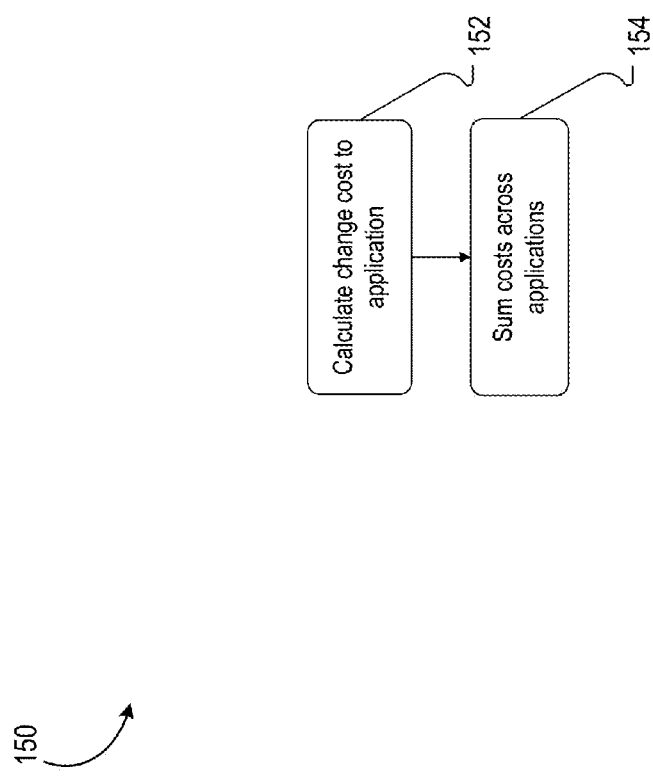

Referring to FIG. 7, system 16 executes process 150 in determining the cost to consuming applications of changing or modifying a service. System 16 calculates (152) the cost to a particular application, e.g., based on executions of the operations in FIGS. 3A-3C, by determining a number of references to the particular service element in the application and the location of those elements. The location of those elements affects the costs. For example, there are 2 projects affected by a change to a particular service element. Project 1 is a well-written, well-maintained and easy to understand project. Project 2 is an old, poorly written and poorly maintained project. As such, changes to Project 2 take an order of magnitude longer than Project 1. This is flagged in the configuration profile for that application accordingly. System 16 sums (154) the costs across the various applications to determine the total cost of modifying a service.

Figure 8:
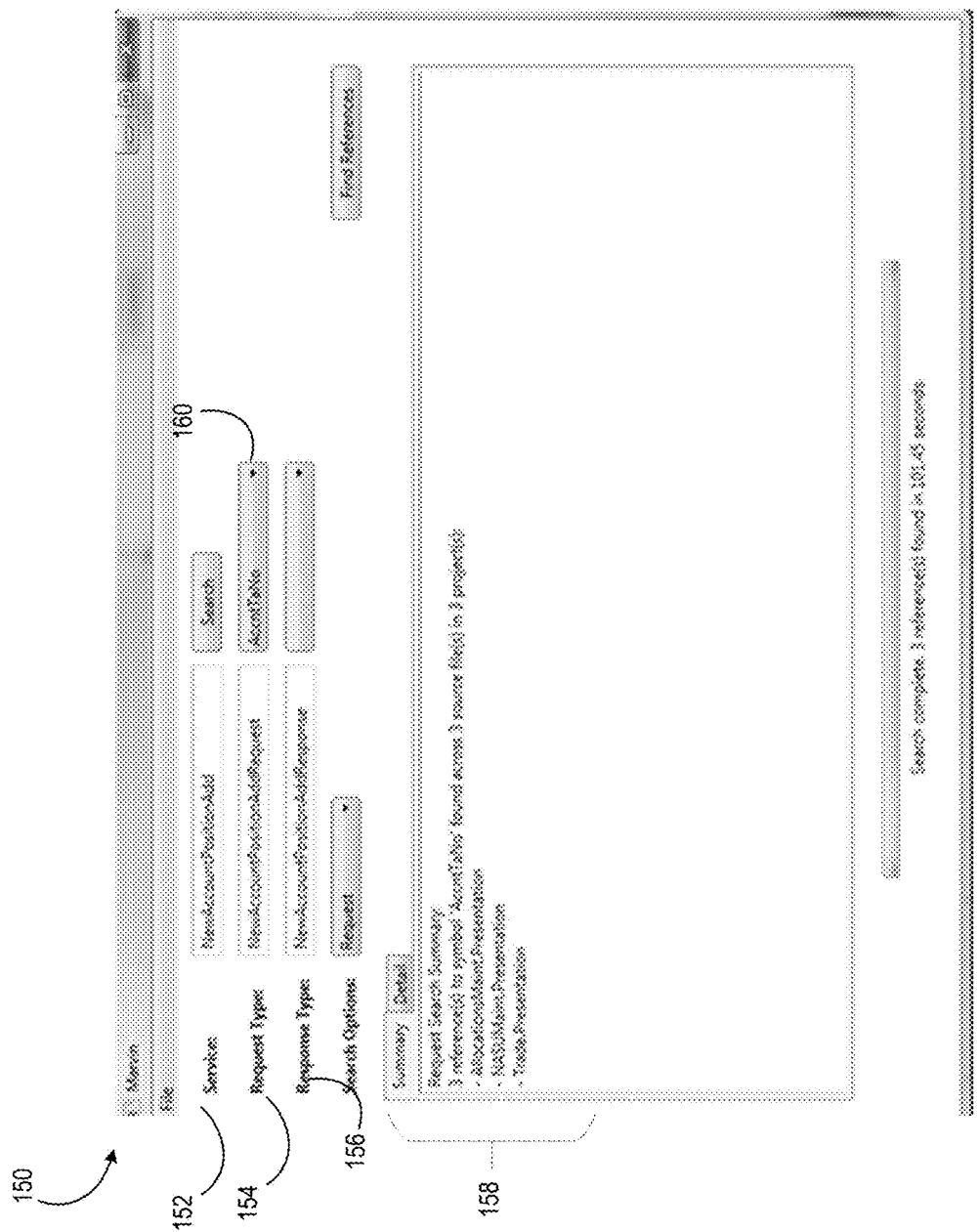
FIGS. 8-9 are graphical user interfaces provided by the system for performing SOA impact analysis.

Referring to FIG. 8, graphical user interface 150 enables a user to search across multiple, different application code bases to determine which applications are utilizing a service. Graphical user interface 150 includes control 152 for input of a service name. In addition to inputting the service name, a user can also search for available services (e.g., services that are offered via system 15). Graphical user interface 150 includes portion 154 for input of information indicative of a request type for the service, e.g., to request a particular type of information from the service. Graphical user interface 150 also includes symbol control 160 for a user to specify or select the symbol that corresponds to the particular request type. The symbols for different types of request types are pre-defined. Symbol control 160 displays the list of potential symbols for a particular request type. System 16 knows or looks-up the symbols for a particular request type, based on configurable rules that establish convention for a particular application. For example, for application x, if x consumes service "ABC", the convention for application x is to have separate source files named ABCRequest and ABCResponse, corresponding to the service request and response class definitions. Application y, may just have 1 source file ABC which includes both class definitions, and so forth.

Graphical user interface 150 also includes portion 156 for input of information indicative of a service response type. Using this input information, system 16 determines which applications utilize the input response/request types. Graphical user interface 150 includes portion 158 for the display of summary information that specifies which applications utilize the symbol specified via symbol control 160.

Figure 9:
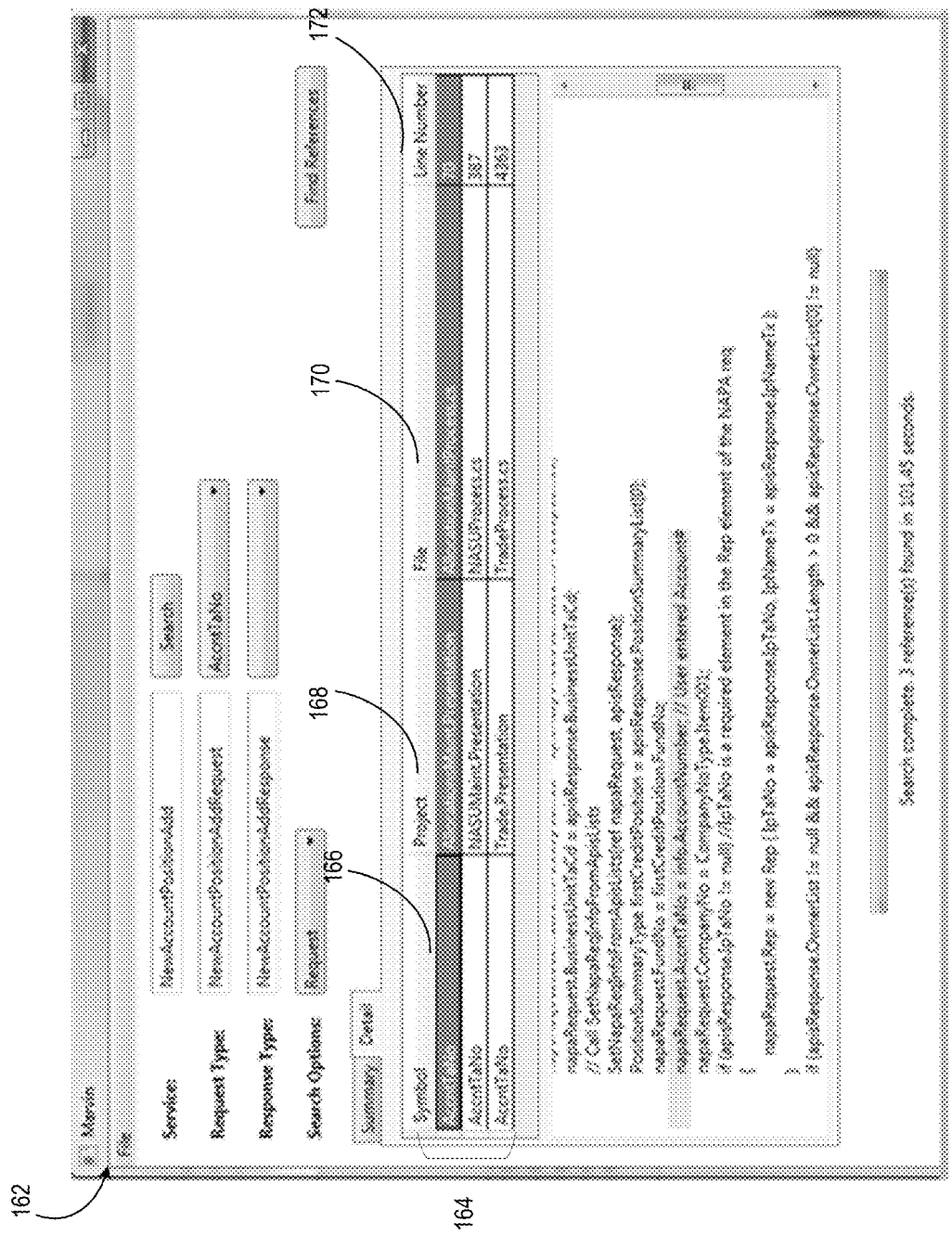

Referring to FIG. 9, graphical user interface 162 displays in portion 164 details of which applications include references to a particular symbol. Portion 164 displays symbol information 166, which specifies which symbol associated with a service was searched across multiple code bases. Portion 164 includes project information 168, which specifies which projects (e.g., applications) included the symbol or a reference to the symbol (e.g., via a reference to a declaring assembly). Portion 164 includes file information 170 that specifies which file of a project includes the reference to the symbol. Portion 164 includes line number information 172 that specifies where in the respective files the reference to the symbol is located. The information displayed in portion 164 is based on compiled code for the various applications. This compiled code includes the actual references to the symbols, e.g., based on an inclusion of a reference to the declaring assembly and declaring class in the application code base.

Figure 10:
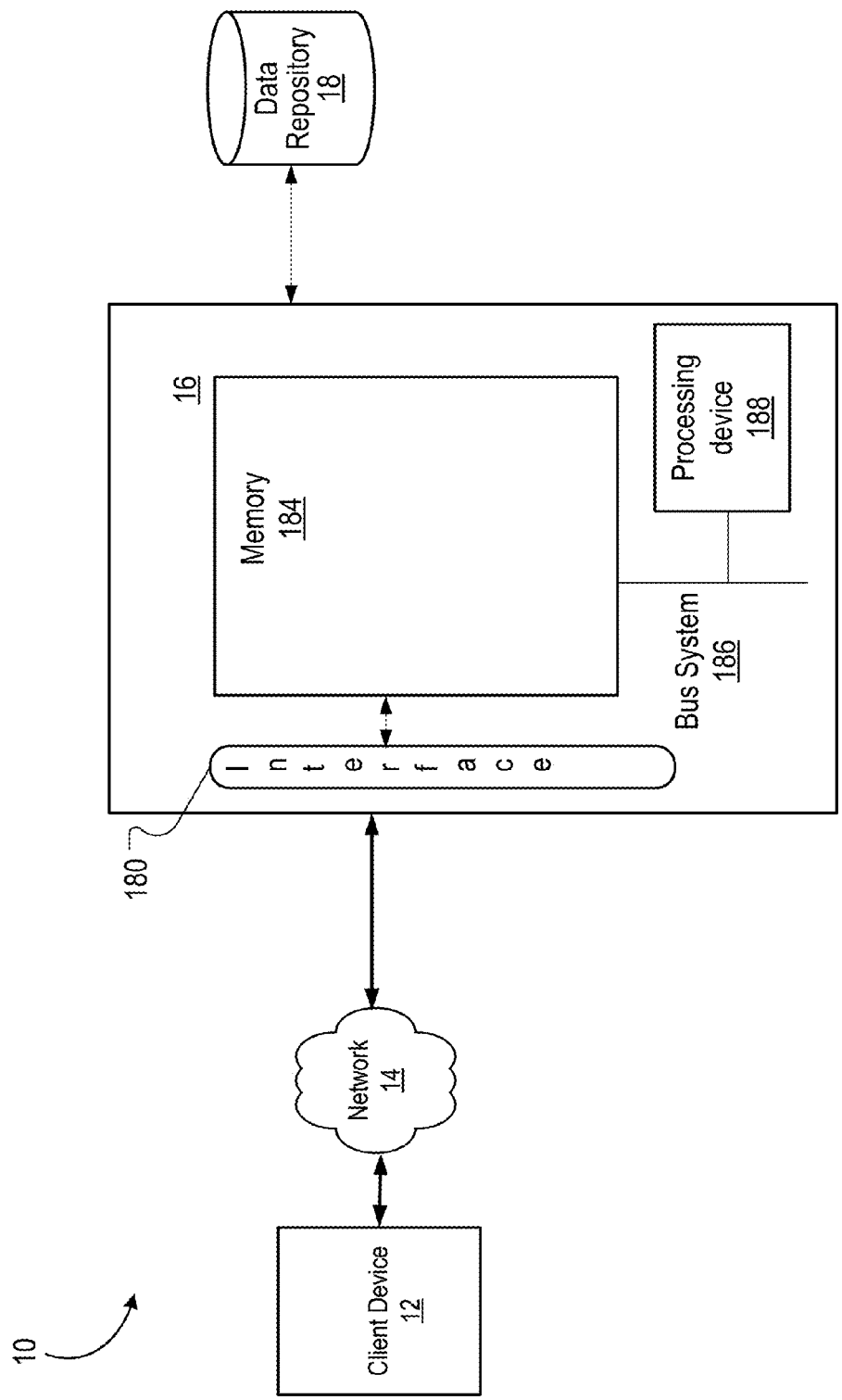
FIG. 10 is a diagram of components of the system for performing SOA impact analysis.

Referring to FIG. 10, client device 12 can be any sort of computing device capable of taking input from a user and communicating over network 14 with system and/or with other client devices. Client device 12 can be a mobile device, a desktop computer, a laptop, a cell phone, a personal digital assistant ("PDA"), a server, an embedded computing system, a mobile device and so forth.

System 16 can be any of a variety of computing devices capable of receiving information, such as a server, a distributed computing system, a desktop computer, a laptop, a cell phone, a rack-mounted server, and so forth. System 16 may be a single server or a group of servers that are at a same location or at different locations.

System 16 can receive information from client device 12 via interface 180, which is any type of interface capable of receiving information over a network, such as an Ethernet interface, a wireless networking interface, a fiber-optic networking interface, a modem, and so forth. System 16 also includes a processing device 188 and memory 184. A bus system 186, including, for example, a data bus and a motherboard, can be used to establish and to control data communication between the components of system 16. Processing device 188 may include one or more microprocessors. Generally, processing device 188 may include any appropriate processor and/or logic that is capable of receiving and storing data, and of communicating over a network (not shown). Memory 184 can include a hard drive and a random access memory storage device, such as a dynamic random access memory, machine-readable media, a machine-readable hardware storage device or other types of non-transitory machine-readable hardware storage devices.

Embodiments can be implemented in digital electronic circuitry, or in computer hardware, firmware, software, or in combinations thereof. An apparatus can be implemented in a computer program product tangibly embodied or stored in a machine-readable hardware storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a."

A number of exemplary embodiments of the invention have been described. Nevertheless, it will be understood by one of ordinary skill in the art that various modifications may be made without departing from the spirit and scope of the techniques described herein.

What is claimed is:

1. A computer-implemented method comprising:
    accessing, by a server computing device, information indicative of a service on which to perform impact analysis, wherein the service comprises a self-contained unit of computing functionality and the service is part of a service oriented architecture (SOA) comprising a plurality of computing devices arranged to make available one or more services and execute one or more first application programs that utilize the services to perform functionality of a second application program;
    generating, by the server computing device, a service definition that is indicative of how one or more of the first application programs locally utilizes the service, comprising:
        accessing information indicative of service request and response elements for the service;
        searching source code files of the service for patterns matching the service request and response elements for the service;
        identifying, based on the searching, one or more of the source code files having code matching the service request and response elements for the service;
        determining containing solutions for the identified one or more source code files;
        loading the containing solutions into a parser;
        generating, based on application of the parser to the containing solutions, one or more syntax trees that specify which declaring classes are associated with the service request and response elements for the service;
        retrieving, from a data repository, information indicative of a symbol that is associated with the service request and response elements for the service and is used by the declaring classes to access the elements of the service;
        searching the declaring classes for one or more references to the symbol; and
        storing information indicative of which declaring classes reference which symbols;
    searching, by the server computing device based on the service definition, a plurality of application code bases for one or more references to the service, wherein each of the application code bases comprises a set of source code files and resources associated with a first application program;
    identifying, by the server computing device based on the searching, one or more of the first application programs that utilize the service; and
    determining, by the server computing device based on the application code bases for the identified first applications, an impact of a modification to the service.

2. The computer-implemented method of claim 1, further comprising:
    determining, by the server computing device, one or more declaring assemblies that reference the declaring classes by searching a hierarchical structure of assemblies and classes; and
    updating, by the server computing device, the service definition to include the one or more declaring assemblies.

3. The computer-implemented method of claim 2, wherein searching the plurality of application code bases for the one or more references to the service comprises:
    searching, by the server computing device, the plurality of application code bases for references to the one or more declaring assemblies.

4. The computer-implemented method of claim 2, further comprising:
    transmitting, by the server computing device to a client device information indicative of one or more elements of the service;
    receiving, by the server computing device from the client device, information indicative of a selection of at least one of the one more elements;
    identifying, by the server computing device, a project that consumes the declaring assembly for the selected elements as specified by the service definition;
    grepping, by the server computing device, the source code files of the identified project to confirm a name of a symbol for the selected elements appears in the source code files; and
    executing, by the server computing device, the parser to identify valid symbol references in the consuming project to confirm the consumption.

5. The computer-implemented method of claim 1, wherein the service definition specifies how one of the first application programs references the service, and wherein searching comprises:
    searching, by the server computing device, the plurality of application code bases for a reference to the service as specified by the service definition or for a reference to a file that calls the service as specified by the service definition.

6. The computer-implemented method of claim 1, wherein determining the impact of the modification comprises:
    determining, by the server computing device, a cost of the modification by determining a number of application programs that utilize the service and are affected by the modification.

7. One or more machine-readable hardware storage devices storing instructions that are executable by a server computing device to perform operations comprising:
    accessing, by the server computing device, information indicative of a service on which to perform impact analysis, wherein the service comprises a self-contained unit of computing functionality and the service is part of a service oriented architecture (SOA) comprising a plurality of computing devices arranged to make available one or more services and execute one or more first application programs that utilize the services to perform functionality of a second application program;
    generating, by the server computing device, a service definition that is indicative of how one or more of the first application programs locally utilizes the service, comprising:
        accessing information indicative of service request and response elements for the service;

searching source code files of the service for patterns matching the service request and response elements for the service;

identifying, based on the searching, one or more of the source code files having code matching the service request and response elements for the service;

determining containing solutions for the identified one or more source code files;

loading the containing solutions into a parser;

generating, based on application of the parser to the containing solutions, one or more syntax trees that specify which declaring classes are associated with the service request and response elements for the service;

retrieving, from a data repository, information indicative of a symbol that is associated with the service request and response elements for the service and is used by the declaring classes to access the elements of the service;

searching the declaring classes for one or more references to the symbol; and storing information indicative of which declaring classes reference which symbols;

searching, by the server computing device based on the service definition, a plurality of application code bases for one or more references to the service, wherein each of the application code bases comprises a set of source code files and resources associated with a first application program;

identifying, by the server computing device based on searching, one or more of the first application programs that utilize the service; and determining, by the server computing device based on the application code bases for the identified first application programs, an impact of a modification to the service.

8. The one or more machine-readable hardware storage devices of claim 7, wherein the operations further comprise:

determining, by the server computing device, one or more declaring assemblies that reference the declaring classes by searching a hierarchical structure of assemblies and classes; and updating, by the server computing device, the service definition to include the one or more declaring assemblies.

9. The one or more machine-readable hardware storage devices of claim 8, wherein searching the plurality of application code bases for the one or more references to the service comprises:

searching, by the server computing device, the plurality of application code bases for references to the one or more declaring assemblies.

10. The one or more machine-readable hardware storage devices of claim 8, wherein the operations further comprise:

transmitting, by the server computing device to a client device information indicative of one or more elements of the service;

receiving, by the server computing device from the client device, information indicative of a selection of at least one of the one more elements;

identifying, by the server computing device, a project that consumes the declaring assembly for the selected elements as specified by the service definition;

grepping, by the server computing device, the source code files of the identified project to confirm a name of a symbol for the selected elements appears in the source code files; and executing, by the server computing device, the parser to identify valid symbol references in the consuming project to confirm the consumption.

11. The one or more machine-readable hardware storage devices of claim 7, wherein the service definition specifies how one of the first application programs references the service, and wherein searching comprises:

searching the plurality of application code bases for a reference to the service as specified by the service definition or for a reference to a file that calls the service as specified by the service definition.

12. The one or more machine-readable hardware storage devices of claim 7, wherein determining the impact of the modification comprises:

determining a cost of the modification by determining a number of the first application programs that utilize the service and are affected by the modification.

13. An electronic system comprising:

a server computing device; and one or more machine-readable hardware storage devices storing instructions that are executable by the server computing device to perform operations comprising:

accessing information indicative of a service on which to perform impact analysis, wherein the service comprises a self-contained unit of computing functionality and the service is part of a service oriented architecture (SOA) comprising a plurality of computing devices arranged to make available one or more services and execute one or more first application programs that utilize the services to perform functionality of a second application program;

generating a service definition that is indicative of how one or more of the first application programs locally utilizes the service, comprising:

accessing information indicative of service request and response elements for the service;

searching source code files of the service for patterns matching the service request and response elements for the service;

identifying, based on the searching, one or more of the source code files having code matching the service request and response elements for the service;

determining containing solutions for the identified one or more source code files;

loading the containing solutions into a parser;

generating, based on application of the parser to the containing solutions, one or more syntax trees that specify which declaring classes are associated with the service request and response elements for the service;

retrieving, from a data repository, information indicative of a symbol that is associated with the service request and response elements for the service and is used by the declaring classes to access the elements of the service;

searching the declaring classes for one or more references to the symbol; and storing information indicative of which declaring classes reference which symbols;

searching, based on the service definition, a plurality of application code bases for one or more references to the service, wherein each of the application code bases comprises a set of source code files and resources associated with a first application program;

identifying, based on searching, one or more of the first application programs that utilize the service; and determining, based on the application code bases for the identified first application programs, an impact of a modification to the service.

14. The electronic system of claim 13, wherein the operations further comprise:
determining one or more declaring assemblies that reference the declaring classes by searching a hierarchical structure of assemblies and classes; and
updating the service definition to include the one or more declaring assemblies.

15. The electronic system of claim 14, wherein searching the plurality of application code bases for the one or more references to the service comprises:
searching the plurality of application code bases for references to the one or more declaring assemblies.

16. The electronic system of claim 14, wherein the operations further comprise:
transmitting to a client device information indicative of one or more elements of the service;
receiving, from the client device, information indicative of a selection of at least one of the one more elements;
identifying a project that consumes the declaring assembly for the selected elements as specified by the service definition;
grepping the source code files of the identified project to confirm a name of a symbol for the selected elements appears in the source code files; and
executing the parser to identify valid symbol references in the consuming project to confirm the consumption.

17. The electronic system of claim 13, wherein the service definition specifies how one of the first application programs references the service, and wherein searching comprises:
searching the plurality of application code bases for a reference to the service as specified by the service definition or for a reference to a file that calls the service as specified by the service definition.

* * * * *